United States Patent [19]

Koenig

[11] Patent Number: 5,467,071
[45] Date of Patent: Nov. 14, 1995

[54] AUDIOVISUAL SAFETY WARNING KIT

[75] Inventor: Don M. Koenig, Atlanta, Ga.

[73] Assignee: Gerald J. Churchill, Atlanta, Ga.

[21] Appl. No.: 166,837

[22] Filed: Dec. 15, 1993

[51] Int. Cl.⁶ .................................................. B60Q 1/26
[52] U.S. Cl. ...................... 340/433; 340/692; 340/460; 362/80
[58] Field of Search ...................... 340/433, 460, 340/474, 459, 457, 468, 472, 432, 692; 381/51, 86, 123; 362/249, 80, 227, 216

[56] References Cited

U.S. PATENT DOCUMENTS

| | | | |
|---|---|---|---|
| 3,845,250 | 10/1974 | O'Brien | 179/100.4 R |
| 3,902,159 | 8/1975 | Parolin | 340/433 |
| 4,088,882 | 5/1978 | Lewis | 362/217 |
| 4,607,317 | 8/1986 | Lin | 362/216 |
| 4,677,429 | 6/1987 | Glotzbach | 340/459 |
| 4,964,022 | 10/1990 | Lane | 362/216 |
| 5,062,027 | 10/1991 | Machida et al. | 362/227 |
| 5,132,666 | 7/1992 | Fahs | 340/472 |
| 5,193,141 | 3/1993 | Zwern | 340/460 |
| 5,245,694 | 9/1993 | Zwern | 381/86 |
| 5,281,948 | 1/1994 | Estrada | 340/433 |

OTHER PUBLICATIONS

"Parts & Accessories", catalog #555J p. 64 "decorative strip lights".

*Primary Examiner*—Brent Swarthout
*Assistant Examiner*—Niker Tong
*Attorney, Agent, or Firm*—Dowell & Dowell

[57] ABSTRACT

An audiovisual safety warning kit for use with a vehicle includes lighting for mounting to the vehicle to produce a visual safety warning and to illuminate the ground adjacent to the vehicle. The kit further includes a device which stores audio safety prompting messages and an associated audio speaker which emits the messages to vehicle passengers. The storage device relays safety messages to the speaker in response to receiving an electrical signal provided by an activating device or by a vehicle driver. The activating device is mounted adjacent to steps of the vehicle such that it is activated by persons boarding or exiting the vehicle. The driver can select a stored audio message, or can create a supplemental audio message which is directly emitted by the speaker system.

15 Claims, 3 Drawing Sheets

AUDIOVISUAL SAFETY WARNING KIT

BACKGROUND OF THE INVENTION

This invention relates to a safety warning kit, and, more particularly to a safety warning kit for use with a vehicle. The kit produces a visual safety warning to passengers of the vehicle, and to drivers of nearby vehicles, and audio safety prompting messages that are audible to the passengers.

Discussion of the Related Art

All school buses that are today in service are equipped with standard warning devices such as stop signs and flashing warning lights that are activated when the bus is stopped to allow passengers to board or exit. Such warning devices are intended to produce a visual safety warning to alert drivers of nearby vehicles to drive cautiously or stop because pedestrians may be present in the immediate vicinity of the bus.

Such flashing lights are generally located high on the rear wall of the bus and close to the roof. Additional flashing lights have also been mounted on the roof of the bus near the rear wall. It has further been known as exemplified by U.S. Pat. No. 4,964,022 to Lane, to mount lighting on the roof of a bus above the hinged side doors so as to illuminate the ground adjacent to the side doors to aid the passengers.

The known warning devices, however, have been inadequate for at least two very important previously unrecognized reasons. First, the known lighting systems have not been suitably mounted on buses at positions such that the lights can be seen at all times by drivers of other nearby vehicles, by people on the ground adjacent to the bus, and especially people standing along the sides the bus. More particularly, the known lighting systems have been mounted too high on the buses relative to the eye level of the other drivers to be visible to them when their vehicles are very close to the bus. This has been a serious safety problem because it is at those same times when the boarding or exiting passengers are most vulnerable to being struck by such vehicles. Thus, there has been an urgent need for warning lights mounted on the bus that are visible to drivers of all nearby vehicles at all times, and especially when they are close to the bus.

Furthermore, the warning lights have been mounted at only specific areas of a vehicle such as the front and the rear end of the bus or on pivotable stop signs on the driver's side of the bus, and thus are not visible to individuals approaching from the sides of the bus. Thus, there has been a need for warning lighting to be mounted on the buses such that it is visible to individuals positioned or approaching anywhere about the perimeter of the bus. Also, the warning lights of the known lighting systems have been inadequate because they have not provided warning to the bus passengers, and especially when boarding or exiting the bus.

Secondly, there has been a need for a warning system which provides an audio warning message to the passengers of the bus to be cautious of nearby moving vehicles and other potentially dangerous hazards inside or outside of the bus. Such audio messages would supplement the visual warning. Furthermore, there has also been a need for such an audio warning device located at a position on the bus such that the audio warning will assuredly be heard by the intended persons.

The problems associated with the inadequacies of the known warning devices are amplified when children are passengers of the bus, such as for school buses. Children are generally less cognizant of the hazards associated with the nearby moving vehicles, and thus are insufficiently attentive to them. Moreover, even for those more safety conscious children, reinforcement in the form of a constant safety reminder would assure that those children remain mindful of safety. Thus, there has been a need for an audiovisual safety warning system which provides such a constant safety reminder to all children. Furthermore, there has been a need for a system which allows the vehicle driver to manually create and emit a personal audio message while the vehicle is moving.

SUMMARY OF THE INVENTION

The present invention has been made in view of the above inadequacies of the prior art and has as an object to provide an audiovisual safety warning kit for use with a vehicle which produces a visual safety warning to drivers of nearby vehicles and to persons standing near the vehicle, and audio safety prompting messages to passengers boarding and exiting the vehicle, and supplemental audio messages to passengers while the vehicle is moving.

Another object of the present invention is to provide an audiovisual safety warning kit that is mountable to a vehicle such that the visual safety warning is visible to passengers, drivers of nearby vehicles, and to people standing on the ground about the perimeter of the vehicle, and the audio safety prompting messages are audible to all intended persons.

A further object of the present invention is to provide an audiovisual safety warning kit that is inexpensive and easily mounted to existing vehicles.

To achieve the objects of the invention, as embodied and broadly described herein, the audiovisual safety warning kit in accordance with the present invention comprises substantially continuous lighting for producing a visual safety warning. The lighting is mounted along the sidewalls and to the rear wall of the vehicle, and is electrically connected to the electrical system thereof.

The audiovisual safety warning kit in accordance with the present invention further comprises an audio safety prompting message device that is audible to passengers boarding and exiting the bus. The safety prompting message device includes means for storing audio messages, which is activated by passengers boarding or exiting the vehicle, to cause the audio messages to be electrically transmitted to an audio speaker and audibly emitted to the passengers.

DETAILED DESCRIPTION OF THE PREFERRED EMBODIMENT

The present invention will now be described in detail with reference to the accompanying drawings.

Figure 1:
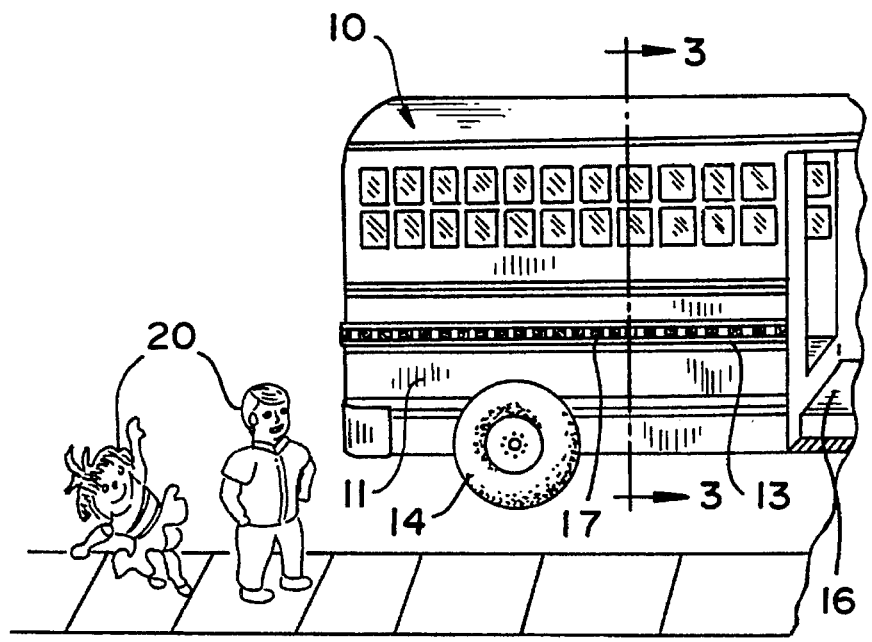
FIG. 1 is a side elevational view of a bus having lighting in accordance with a preferred embodiment of the present invention mounted to a sidewall.
Figure 2:
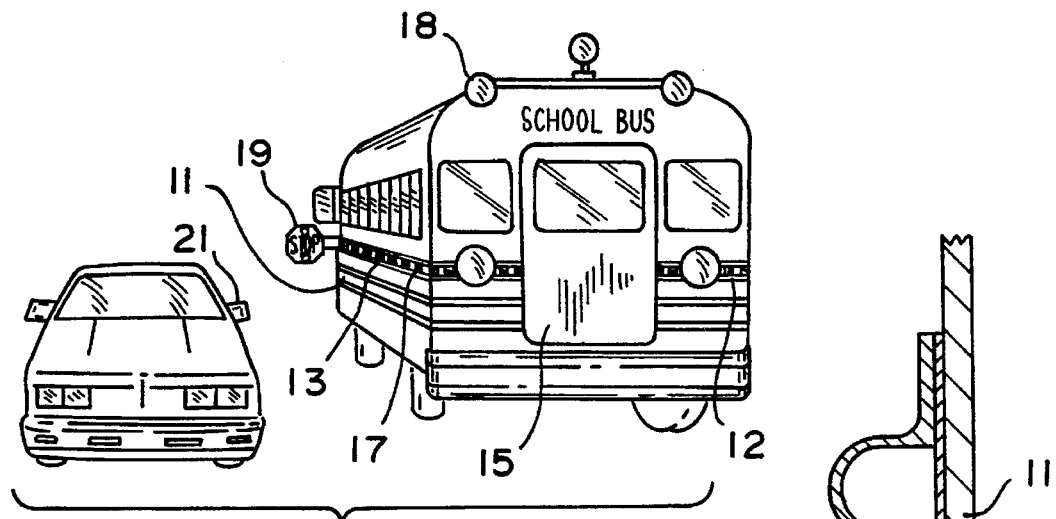
FIG. 2 is a rear elevational view of the bus illustrated in FIG. 1 showing the lighting mounted on both sides of the rear door and to the driver's side of the bus.
Figure 3:
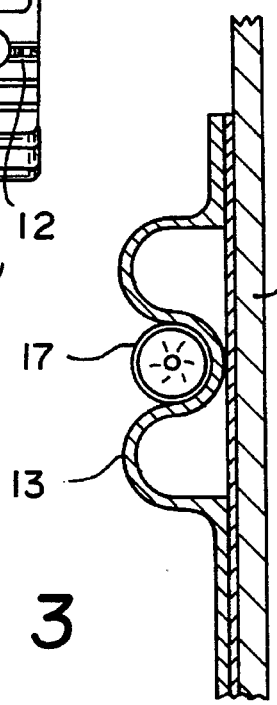
FIG. 3 is a cross-sectional view in the direction of line 3—3 of FIG. 1 illustrating the lighting received in a sidewall channel of the bus.

FIGS. 1 and 2 illustrate a school bus 10 of conventional construction which is used to transport passengers. It will be understood that the present invention may be used with other types of vehicles such as other types of buses, public trams, delivery trucks and the like which make frequent stops. It may also be used with trains. The bus includes side walls 11 and a rear wall 12 which include a channel member 13 for strengthening the sidewalls against collisions. As illustrated in FIG. 3, the channel 13 has a concave shape. The channel is located above the wheels 14, and extends from the right side of the rear door 15, to the hinged side doors 16 for boarding and exiting the vehicle, and from the left side of the rear door to a position on the left side of the bus near a driver operated stop sign 19, which is located approximately across from the side doors.

Figure 4:
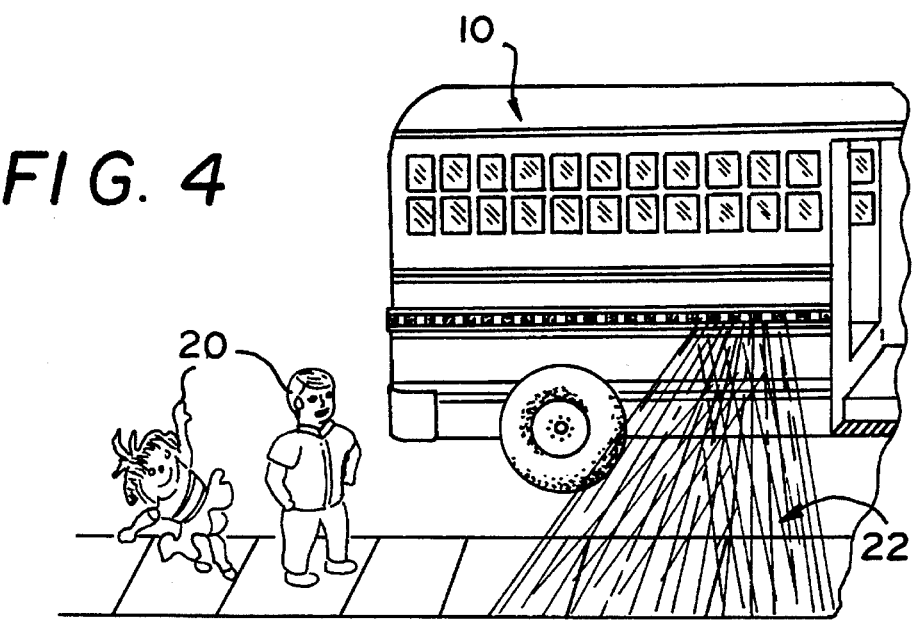
FIG. 4 is a partially broken away side elevational view of the bus illustrated in FIG. 1 depicting illumination of the ground adjacent to the vehicle by the lighting.

Lighting strips 17 for producing visual safety warnings that are visible to passengers 20, whether standing alongside, boarding or exiting the bus, and to drivers of nearby vehicles 21, are mounted to the sidewalls and the rear wall of the bus. As illustrated in FIG. 4, the lighting strips also illuminate the ground alongside the bus without causing glare for the passengers.

As embodied herein, the lighting strips are elongated, and preferably have lengths such that they extend along the entire length of the channels 13. In accordance with the invention, the lighting strips are mounted to the bus at a height such that they are readily visible to approaching vehicle drivers, and also to passengers standing outside of the vehicle. The lighting strips are preferably mounted within the channel 13. Electrical conductors extend across the rear door 15 to electrically connect the two lighting strip sections which terminate at opposite sides of the rear door as illustrated in FIG. 2.

As illustrated in FIG. 3, the lighting strips preferably have a shape and size that are compatible with the channels such that they can be mounted within the channels and maintained firmly therein by a force fit. For example, the lighting strips may be tubular as illustrated in FIG. 3. In order to prevent the lighting strips from being removed from the vehicle, they may be secured within the channels by high strength adhesives or fasteners.

Figure 5:
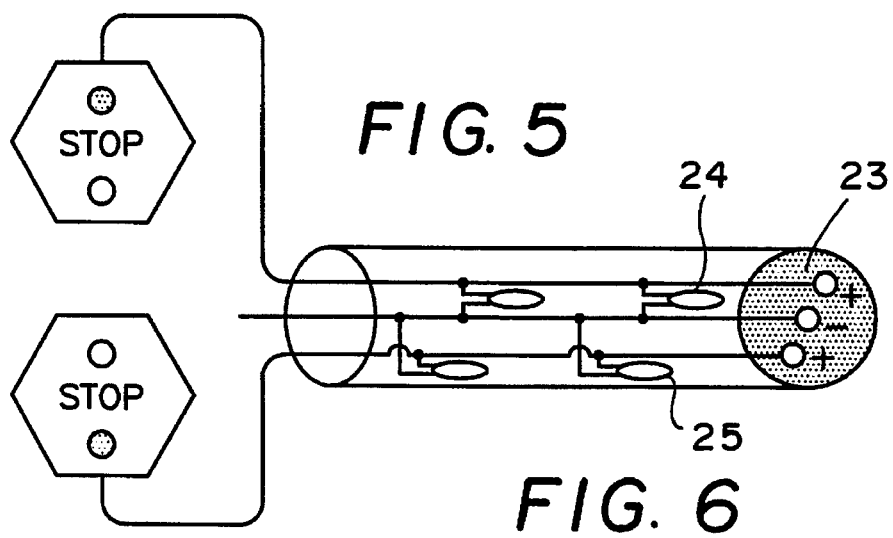
FIG. 5 illustrates a preferred lighting configuration.

As illustrated in FIG. 5, the lighting strip is preferably a tubular solid polymer material 23 having circuits 24 and 25 embedded within the polymer. Suitable lighting is disclosed in U.S. Pat. No. 4,607,317 to Lin, the contents of which are incorporated herein by reference. The polymer diffuses glare caused by the lights contained within the lighting strip, and prevents moisture accumulation within the strip due to condensation. The lighting strips may be provided in a wide variety of colors, and, preferably, red or yellow. The lighting strips preferably include waterproof electrical connectors to connect the lighting sections.

The lighting strips 17 in accordance with the invention may be used with vehicles other than buses which lack similar channels. To make the lighting compatible with such vehicles, the kit may optionally include mounting tracks (not shown) for receiving the lighting strips, which are mounted to the exterior of the vehicles. The mounting tracks may be attached to vehicles using conventional fasteners such as screws or the like.

Figure 7:
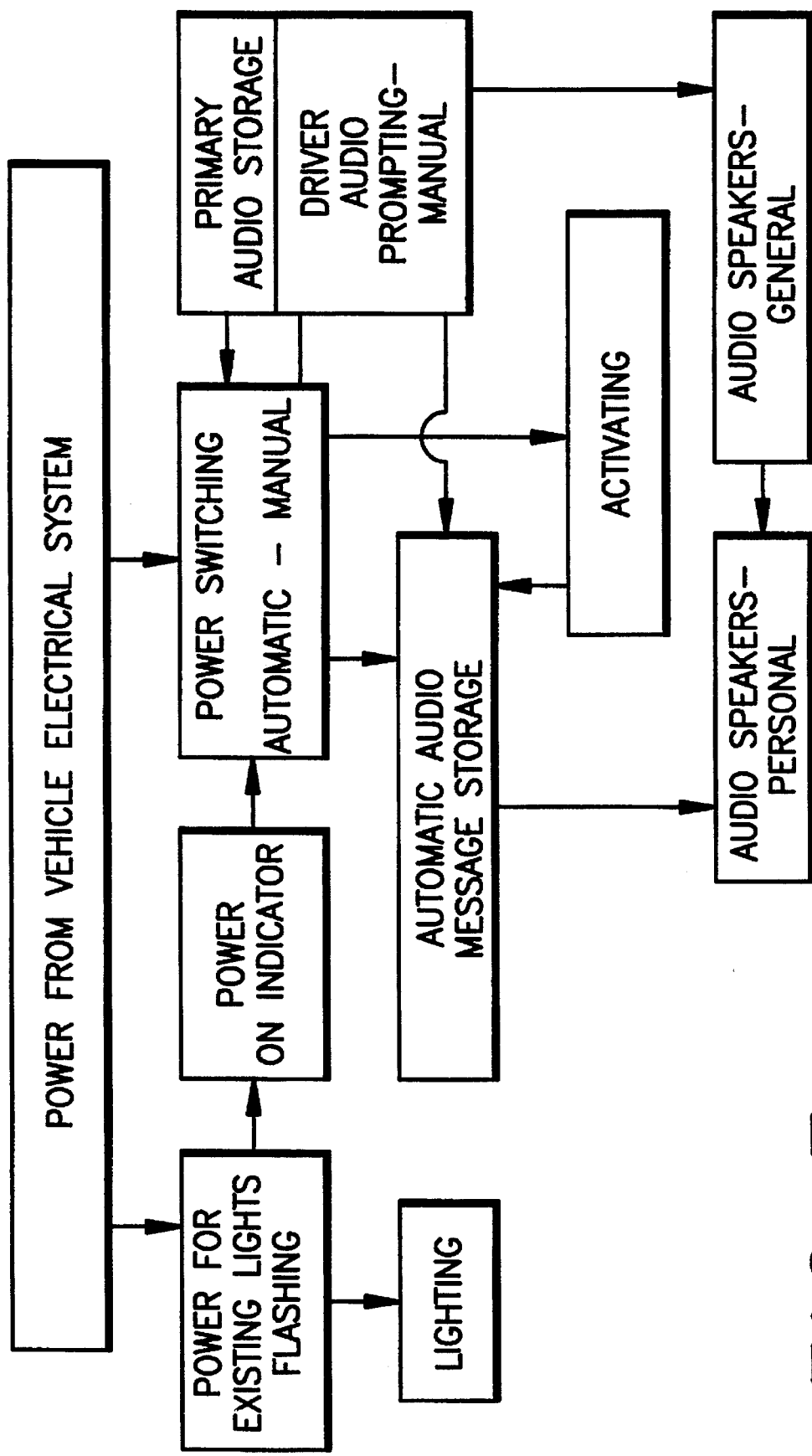
FIG. 7 is a block diagram of an audiovisual safety warning device in accordance with a preferred embodiment of the present invention.

The circuits 24 and 25 preferably have offset bulb spacing so that one circuit can be used as a flashing light source and the other circuit can be used as a constant burn light source. The lighting means is preferably used in the flashing mode by electrically connecting it to a flasher control associated with the conventional warning lighting of a vehicle. Such warning lighting is generally mounted to or near the front or rear walls, or to the roof of a conventional bus, and is activated when the bus is stopped. FIG. 2 illustrates warning lights 18 mounted to the rear wall 12. The conventional bus also generally includes the stop sign 19 which instructs vehicle drivers to stop because passengers are boarding or exiting the bus. The stop sign is activated by stopping the bus and is visible to vehicle drivers approaching the front and rear of the bus. By connecting the lighting strips in accordance with the present invention to the electrical wiring system of the bus as depicted in the block diagram of FIG. 7, the lighting can also be activated by stopping the bus. The lighting strips are preferably electrically connected to the wiring harness associated with the stop sign or to the fuse panel. The lighting strips 17 can contain different numbers of circuits depending on the application.

In accordance with the invention, the audiovisual safety warning kit further includes a device for producing audio safety prompting messages that are audible to passengers boarding and exiting the bus. Such audio safety messages are related to hazards associated with nearby vehicles and with maintaining safe behavior on the bus. For example, the safety messages may be similar to the following safety rules promoted by the National Parent Teacher Association:

1. Be on time.
2. Never run to or from the bus.
3. Stand back from the curb.
4. Don't push or shove.
5. Stay in your seat.
6. Don't yell or shout.
7. Always obey the driver.
8. Wait for the driver's signal before crossing.
9. Always cross at least 10 feet in front of the bus.
10. Never crawl under a school bus.

As embodied herein, the device for providing the audio safety messages preferably includes a memory for storing audio safety prompting messages, a manually activated circuit which the driver activates to transmit a personal audio message, a sensor for activating the memory to cause stored audio messages to be electrically transmitted, and at least one speaker to receive the transmitted messages and convert them to audible messages for the passengers. These elements of the safety message providing device are electrically connected to each other, and to the electrical wiring system of the bus as depicted in the block diagram of FIG. 7.

As embodied herein, the memory for storing the audio safety prompting messages preferably includes a circuit board having a selected number of integrated circuits or microchips mounted thereon for storing a plurality of audio safety prompting messages. The memory unit may be programmable so that the messages can be changed as desired. Other storing or memory units such as a tape recorder may optionally be used.

The storing or memory unit is preferably mounted within the console structure of the bus. It may optionally be mounted at other appropriate locations within the bus.

As embodied herein, the activating device may include a pressure sensor switch that is activated by pressure exerted by passengers, or by their motion, as they board or exit the bus. For example, the device may be a pressure sensitive mat or the like, which is placed on a step associated with the side doors 16 which is activated by a passenger's weight.

If a motion detecting device is used as the activating device, it is activated by motion of the passengers traversing the steps. The motion detecting device may produce a motion detecting beam, in which case the device is activated when the beam is broken by a passenger walking through it. Such device is to be located above one of the steps of the bus such that the beam extends across the step. The activating device may optionally be a sensor that detects the side doors 16 opening or closing.

The manually activated circuit for the driver can be used while the vehicle is stopped or moving to emit the driver's own disciplinary or other type of audio message.

In accordance with the invention, the device for producing audio safety prompting messages further includes at least one audio speaker. The audio speaker receives the audio safety prompting messages in the form of electrical signals from the storing or memory unit after it has been activated by the activating device, and converts the electrical signals to audible messages for the passengers. An audio speaker is preferably mounted adjacent to the side doors so that the passengers will hear the audio messages while boarding or exiting the bus. Preferably, the audio messages are only loud enough for individual passengers traversing the steps to hear them. Additional speakers may optionally be mounted at other locations of the bus if it is desired that the messages be heard by additional passengers.

Figure 6:
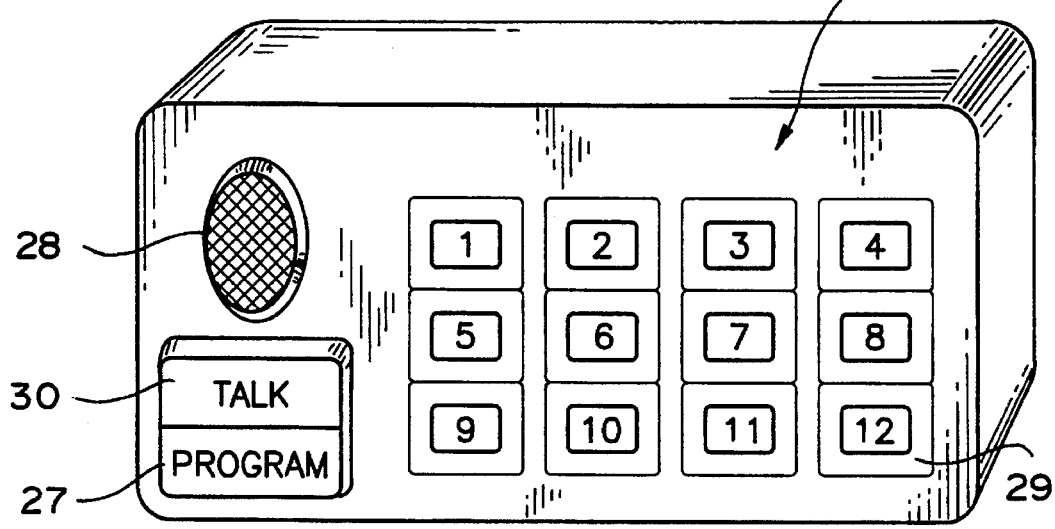
FIG. 6 illustrates a panel containing message control buttons and a microphone.

As illustrated in FIG. 6, a control panel 26 is provided for operation by the vehicle driver. The control panel includes a programming button 27 which is depressed to record audio messages by speaking into a microphone 28. A plurality of buttons 29 are provided which each correspond to an audio message, and which when depressed by the driver, cause a selected audio message to be emitted. A button 30 is also provided for the driver to produce a personal audio message by speaking into the microphone.

The audiovisual safety warning kit of the present invention provides a visual safety warning to approaching vehicles and to persons near the sides of the bus, and a constant visual warning and audio safety reminder to passengers to proceed with caution. Consequently, the audiovisual safety warning kit frees the bus driver to closely watch the passengers, and especially those crossing too close in front of or behind the vehicle whom otherwise could not be closely observed. Thus, the present invention assures a substantially safer environment than has been previously possible for conventional vehicles including buses equipped with the known warning devices.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. A kit for producing an audiovisual safety warning for use in combination with a vehicle including a body having sidewalls and a rearwall, wheels, an exterior channel disposed above the wheels and having a length so as extend substantially along the sidewalls and rearwall, steps for boarding and exiting the vehicle, and an electrical wiring system, the kit comprising:

lighting means for producing a visual safety warning and for illuminating a surface adjacent to the vehicle, said lighting means being adapted to be mounted within the exterior channel and to extend substantially along the length thereof so as to be visible to individuals in close proximity to the vehicle, the lighting means including a constant burn light circuit;

means for electrically connecting said lighting means to the electrical wiring system of the vehicle; and message means for producing verbal audio safety prompting messages audible to individuals inside of the vehicle, said message means being adapted to be mounted to the interior of the vehicle and electrically connected to the electrical wiring system, said message means including:

means for storing said verbal audio safety prompting messages;

means for a driver of the vehicle to create supplemental verbal audio safety prompting messages;

an audio speaker for emitting the stored verbal audio safety prompting messages and said supplemental verbal audio safety prompting messages;

first activation means adapted to be manually triggered by a driver of the vehicle to cause one of said supplemental verbal audio safety prompting messages to be transmitted to and emitted by said audio speaker; and second activation means adapted to be triggered by individuals boarding or exiting on the steps of the vehicle to activate the storing means to cause one of said stored verbal audio safety prompting messages to be transmitted to and emitted by said audio speaker.

2. The kit of claim 1, wherein said lighting means is composed of a solid polymeric substance.

3. The kit of claim 1, wherein said lighting means comprises a flashing light circuit which is activated when the vehicle is stopped.

4. The kit of claim 1, wherein the storing means comprises a circuit board having an integrated circuit for storing said verbal audio safety prompting messages.

5. The kit of claim 4, wherein the storing means is programmable.

6. The kit of claim 1, wherein said second activation means comprises a pressure sensitive device adapted to be placed on one of the steps of the vehicle.

7. The kit of claim 1, wherein said second activation means includes a motion detecting device adapted to be mounted adjacent to, and at a height above, one of the steps of the vehicle.

8. In combination:

a bus including a body having sidewalls and a rearwall, wheels, steps for individuals to board and exit the bus, and an electrical system;

lighting means for producing a visual safety warning and for illuminating a surface adjacent to the bus, said lighting means being mounted above said wheels and extending substantially continuously along the sidewalls and the rear wall of the bus so as to be visible to individuals in close proximity to the bus, said lighting means comprising a constant burn light circuit and being electrically connected to the electrical system of the bus;

message means for producing verbal audio safety prompting messages audible to individuals inside Of the bus, said message means being adapted to be mounted to the bus and electrically connected to the electrical wiring system, said message means including:

means for storing said verbal audio safety prompting messages;

means for a driver of the bus to create supplemental audio safety prompting messages;

an audio speaker for emitting the stored audio safety prompting messages and said supplemental verbal audio safety prompting messages;

first activation means adapted to be triggered by a driver of the bus to cause one of said supplemental verbal audio safety prompting messages to be transmitted to and emitted by said audio speaker; and second activation means adapted to be manually triggered by motion of an individual boarding or exiting the bus to activate the storing means to cause one of said stored verbal audio safety prompting message to be transmitted to and emitted by said audio speaker.

9. The combination of claim 8, wherein said lighting means is composed of a solid polymeric substance.

10. The combination of claim 8, wherein said bus comprises a channel extending substantially continuously along said sidewalls and said rearwall, and said lighting means is mounted within said channel.

11. The combination of claim 8, wherein the storing means comprises a circuit board having an integrated circuit for storing said verbal audio safety prompting messages, and the storing means is programmable.

12. The combination of claim 8, wherein the storing means comprises means for selecting one of said verbal audio safety prompting messages.

13. The combination of claim 8, wherein the second activation means comprises a pressure sensitive device disposed on one of said steps of the bus.

14. The combination of claim 8, wherein the second activation means comprises a motion detecting device mounted adjacent to one of said steps of the bus.

15. A kit for producing an audiovisual safety warning for use in combination with a vehicle including a body, wheels and an electrical wiring system, the kit comprising:

a mounting track adapted to be mounted to the vehicle above the wheels;

lighting means for producing a visual safety warning and for illuminating a surface adjacent to the vehicle, said lighting means being adapted to be mounted within said mounting track and to extend substantially continuously along the body of the vehicle at a height so as to be visible to individuals in close proximity to the vehicle, said lighting means being adapted to be electrically connected to the electrical wiring system and including a constant burn light circuit; and message means for producing verbal audio safety prompting messages audible to persons inside of the vehicle, said message means being adapted to be mounted to the vehicle and electrically connected to the electrical wiring system, said message means including:

means for storing said verbal audio safety prompting messages;

means for a driver of the vehicle to produce supplemental verbal audio safety prompting messages;

an audio speaker for emitting the stored verbal audio safety prompting messages and said supplemental verbal audio safety prompting messages;

first activation means adapted to be manually triggered by a driver of the vehicle to cause one of said supplemental verbal audio safety prompting messages to be transmitted to and emitted by said audio speaker: and second activation means adapted to be triggered by motion of an individual boarding or exiting the vehicle to activate the storing means to cause one of said stored verbal audio safety prompting messages to be transmitted to and emitted by said audio speaker.

* * * * *